(12) United States Patent
Thorpe et al.

(10) Patent No.: US 7,587,419 B2
(45) Date of Patent: Sep. 8, 2009

(54) VIDEO METADATA DATA STRUCTURE

(75) Inventors: Jonathan Richard Thorpe, Winchester (GB); Andrew David Kydd, Berlin/Schoneberg (DE); Mark John McGrath, Bracknell (GB); Alexander John James Miller, Basingstoke (GB); Timothy Stuart Roberts, Hook (GB); Michael John Williams, Basingstoke (GB); Barney Govan, Martinez, CA (US)

(73) Assignee: Sony United Kingdom Limited, Weybridge (GB)

( * ) Notice: Subject to any disclaimer, the term of this patent is extended or adjusted under 35 U.S.C. 154(b) by 246 days.

(21) Appl. No.: 10/395,913

(22) Filed: Mar. 24, 2003

(65) Prior Publication Data
US 2004/0044680 A1   Mar. 4, 2004

(30) Foreign Application Priority Data
Mar. 25, 2002   (GB)   ................................. 0207020.9

(51) Int. Cl.
*G06F 7/00*   (2006.01)
*G06F 17/00*   (2006.01)
(52) U.S. Cl. ..................... 707/104.1; 707/102; 707/100
(58) Field of Classification Search ...................... 707/1, 707/2, 3, 10, 100–102; 715/505, 719
See application file for complete search history.

(56) References Cited

U.S. PATENT DOCUMENTS 5,713,021 A * 1/1998 Kondo et al. ............. 707/103 R (Continued)

FOREIGN PATENT DOCUMENTS

EP   1 241 848 A1   9/2002

(Continued)

OTHER PUBLICATIONS

UK Office for Library and Information Networking, Metadata Watch Report #2, Jan. 2002, http://web.archive.org/web/20020128140621/http://www.schemas-forum.org/metadata-watch/second/section3.html.*

(Continued)

*Primary Examiner*—Apu M Mofiz
*Assistant Examiner*—Brent Stace
(74) *Attorney, Agent, or Firm*—Oblon, Spivak, McClelland, Maier & Neustadt, P.C.

(57) ABSTRACT

A data structure for representing metadata describes the content of at least one shot or sub-shot of information material. The data structure comprises a volume identification defining a data carrier on which the information material is contained, at least one shot identification defining the shot or sub-shot within the material, and at least one type of metadata associated with the content of the shot or sub-shot. The volume identification is arranged at a first hierarchical level and the shot identification is arranged at a lower hierarchical level and the metadata describing the shot is arranged with respect to the shot hierarchical level. The data structure provides an efficient facility for communicating metadata between metadata nodes including application programs which use the metadata. The metadata is identified on the basis of a shot and volume on which the information material which the metadata describes is contained. By arranging the volume identifier at a first hierarchical level, the shot identifier at a lower hierarchical level and the metadata related to the shot or sub-shot within the shot level, a systematic and compatible format for interrogating and retrieving metadata is provided.

10 Claims, 7 Drawing Sheets

U.S. PATENT DOCUMENTS

| | | | | |
|---|---|---|---|---|
| 5,822,542 | A * | 10/1998 | Smith et al. | 709/247 |
| 5,903,892 | A * | 5/1999 | Hoffert et al. | 707/10 |
| 5,983,176 | A * | 11/1999 | Hoffert et al. | 704/233 |
| 6,061,692 | A * | 5/2000 | Thomas et al. | 707/200 |
| 6,115,509 | A * | 9/2000 | Yeskel | 382/309 |
| 6,311,194 | B1 * | 10/2001 | Sheth et al. | 715/505 |
| 6,366,934 | B1 * | 4/2002 | Cheng et al. | 715/513 |
| 6,573,907 | B1 * | 6/2003 | Madrane | 715/719 |
| 6,643,650 | B1 * | 11/2003 | Slaughter et al. | 707/10 |
| 6,760,721 | B1 * | 7/2004 | Chasen et al. | 707/3 |
| 6,880,125 | B2 * | 4/2005 | Fry | 715/513 |
| 6,882,991 | B2 * | 4/2005 | Mory et al. | 706/26 |
| 6,910,029 | B1 * | 6/2005 | Sundaresan | 707/2 |
| 7,212,972 | B2 * | 5/2007 | Sugano et al. | 704/500 |
| 2004/0125124 | A1 * | 7/2004 | Kim et al. | 345/716 |

FOREIGN PATENT DOCUMENTS

| | | |
|---|---|---|
| EP | 1 244 030 | 9/2002 |
| GB | 2 355 818 | 5/2001 |
| GB | 2 373 601 | 9/2002 |
| WO | WO 00/45294 | 8/2000 |

OTHER PUBLICATIONS

Yao, Andrew et al., "Object Oriented Video Metadata & Its Generation" May 4, 2001, Proceedings of 2001 International Symposium on Intelligent Multimedia, Video and Speech Processing (ACM), p. 368-372.*

Overview of B-XML/BML Draft Specification Developed by ARIB. (Association of Radio Industries and Bisinesses) Oct. 1999.

* cited by examiner

```xml
- <Material_Description xmlns:xlink="httP://www.w3.0rg/1999/xlink">   ← NODE
    - <Volume>   ← V.1                                                  ← R.1
        <Label> Reunion</label>
        <ReelNo />
        <TapeNumber/>
        < Country> UK</Country >
        <Producer />
        <Reporter/>
        <Crew />
        <Others />
        <TapeStatus />
        <Memo/>
        <Material_ID Type="UMID | Tele-File |                            ← MD_V.1
            GUID">0400000000bb080000000000000000002001514007f020000010520ff />
        <Representative_Frame Timecode= "01:00:00:01"   ← MD_V.2
            xlink:href="http://avon/tools/keystamp.cgi?   ← MD_V.3
            File=movies/shotstore/0400000000bb080000000000000000002001514007ff"
            xlink:type="simple" />
        <Format Field_Rate= "60 | 59.97 | 25 | 50"> Betacam SX</Format>
    <Shot Aspect_Ratio="16:9 | 4:3 | 14:9" Creation_Time="10:30:05:00   ← MD_S.1
        07/11/00">
        <Material_ID Type= "UMID |
            GUID">0400000000bb080000000000000000002001514007f020000010520/>
        <Title>Reunion17</Title>   ← MD_S.4                             MD_S.3
        <Status>OK</Status>
        <Description>A shot</Description>   ← MD_S.5
        <Notes> Enter any old text here for annotating your shot</Notes>
        <Take>1</Take>
        <Proxy_Video Start_Frame="18" Duration="2056" xlink:type="simple"
            xlink: href= "http://avon/movies/shotstore/0400000000bb0800000000000000"/>
        <InPoint Timecode="01:00:00:01"
            xlink: href="http://avon/tools/keystamp.cgi?   ← MD_S.6
            File = movies / shotstore / 0400000000bb080000000000000000002001514002"
            xlink:type="simple" />
        <OutPoint Timecode="01:00:05:19"
            xlink: href="http://avon/tools/keystamp.cgi?   ← MD_S.7
            File = movies/shotstore/0400000000bb080000000000000000002001514002"
            xlink:type="simple"/> .
        <Representative_Frame Timecode= "01:00:00:01"
            xlink: href="http://avon/tools/keystamp.cgi?   ← MD_S.8
            File =movies/shotstore/0400000000bb080000000000000000002001514002"
            xlink:type="simple"/>
        <Proxy_Audio Start_Frame="18" Duration="2056"
            xlink: href="http://avon/tools/waveform.cgi?
            File= movies/shotstore/0400000000bb080000000000000000002001514002"
            xlink:type="simple"/>                           ← MD_S.9
        <Speech Confidence="6" />
        <Face Confidence= "0" />
        <Interview Confidence= "5" / >
        - <Phrase Inpoint="01:00:00:01" Outpoint="01:03:00:01" >
            <Proxy_Audio Start_Frame="18" Duration= "500" xlink:type="simple"
                xlink : href= "http://avon/tools/waveform.cgi?
                File=movies/shotstore/0400000000bb08000000000000000000020015140"/>
            <Speech_Transcript>is a the</Speech_Transcript>
        </Phrase>
```

Fig. 6A

```
- <EventLog Timecode="01:00:01:16" Event_Time="10:30:04:24
   07/11/00">
    <Keystamp xlink: href= "http://avon/tools/keystamp.cgi?
      File= movies/ shotstore/0400000000bb0800000000000000000020015140"
    xlink:type="simple"/>
    <LoggedBy>paulp</LoggedBy>
    <LoggingTime> 10:30:05:00 07/11/00</LoggingTime>
    <EventType > POI </EventType >
    <Description> some description </Description >
    </EventLog>
- <EventLog Timecode="01:00:02:21" Event_Time="10:30:04:28
   07/11/00">
    <Keystamp xlink:type="simple"
      xlink: href= "http://avon/tools/keystamp.cgi?
      File=movies/shotstore/0400000000bb0800000000000000000020015140"/>
    <LoggedBy>paulp</LoggedBy>
    <LoggingTime> 10:30:05:00 07/11/00</LoggingTime>
    <EventType>POI</EventType>
    <Description> some description </Description>
    </EventLog>
  </Shot> ～ MD_S.2
 </Volume> ～ RV.2
</Material_Description>
```

Fig. 6B

VIDEO METADATA DATA STRUCTURE

FIELD OF THE INVENTION

The present invention relates to data structures for representing metadata describing the content of at least one shot or sub-shot of information material.

In some embodiments the information material may include audio and/or video material or data material.

BACKGROUND OF THE INVENTION

Co-pending UK patent applications 0008431.9, 0008393.1 and 0008427.7 disclose a system for generating audio and/or video (a/v) productions comprising a camera with a camera adapter box and a personal digital assistant (PDA). The camera is arranged in use to generate a/v material by capturing images and sounds which are recorded on a recording medium such as a cassette tape. The adapter box generates metadata describing the content of the a/v material and/or other attributes of the a/v material such as camera parameter settings used to generate the a/v material. The metadata may be communicated via the wireless communications link to the PDA and stored separately from the a/v material. Accordingly, pre-planned shots or excerpts of an a/v production generated by the camera may be associated with metadata, which is related to the a/v material for a particular pre-planned shot or excerpt.

Generally a range of processing devices may use the metadata for storing, navigating or editing the a/v material. Therefore many devices may require access to the metadata.

SUMMARY OF INVENTION

An object of the present invention is to provide an arrangement for efficiently distributing and manipulating metadata in association with the information material to which the metadata relates.

According to the present invention there is provided a data structure for representing metadata describing the content of at least one shot or sub-shot of information material. The data structure comprises a volume identification defining a data carrier on which the information material is contained, at least one shot identification defining the shot or sub-shot within the information material, and at least one type of metadata associated with the content of the shot or sub-shot. The volume identification is arranged at a first hierarchical level and the shot identification is arranged at a lower hierarchical level and the metadata describing the shot or sub-shot is arranged with respect to the shot hierarchical level.

Embodiments of the present invention can provide a data structure, which can be used within a network of devices. The devices form metadata nodes. The data structure provides an efficient facility for communicating metadata between the nodes. The metadata is identified on the basis of a shot and volume on which the material information which the metadata describes is contained. By arranging the volume identifier at a first hierarchical level, the shot identifier at a lower hierarchical level and the metadata related to the shot within the shot level, a systematic and compatible format for interrogating and retrieving metadata is provided.

In some embodiments each shot of material may be subdivided into sub-shots contained within a shot. The term shot is therefore used to identify a segment or unit of information, a sub-shot being a section of that segment or unit. The information material may be a/v material in which case a shot is a substantially continuous period of a/v-material, a sub-shot being a defined section within that substantially continuous period.

In some embodiments the hierarchy of the volume and shot nodes are arranged to the effect that the hierarchy is defined by a schema in accordance with predetermined rules, the rules being established to separate and extract metadata of different types in accordance with the hierarchy. Arranging the volume and shot nodes so that the metadata at volume and shot level can be accessed in accordance with a defined schema provides an advantage in that a consistent and compatible format is maintained for accessing the metadata. Preferably, the schema may be defined in accordance with a mark-up language, such as XML or the like. Accordingly, the rules and definitions for using the data structure are available to anyone wishing develop application programs, which use the metadata structure. Users may access the schema from a web site via the world-wide web organisation.

The data structure according to an embodiment of the present invention may be communicated between application programs via Application Programmer's Interfaces (API). The data structure therefore provides a facility for communicating metadata between application programs in a consistent and compatible format. An advantage is thereby provided in that any application program can communicate metadata with any other application program via APIs. The network may include the world-wide web.

The metadata contained within the data structure for a shot may include a resource location address or a resource identifier of a metadata resource. The metadata resource could be any metadata representing a substantial volume of data, such as a proxy version of the information material. For example if the information material is a/v material the metadata resource may be proxy video data. The address of the resource may be a Uniform Resource Identifier (URI) address allowing access to the resource from any network linked via the World Wide Web. The data structure therefore provides a common and consistent interface format for making metadata and metadata resources available to devices and programs requiring access to the metadata.

According to a further aspect of the present invention there is provided metadata describing audio and/or video material content or attributes represented in a form of a mark-up language. According to a further aspect there is provided a data structure for representing metadata including a field for a material identifier providing a unique or quasi-unique identifier of material, and a field providing a Uniform Resource Identifier from which a representation of the material can be accessed.

Various further aspects and features of the present invention are defined in the appended claims.

BRIEF DESCRIPTION OF DRAWINGS

Embodiments of the present invention will now be described by way of example only with reference to the accompanying drawings, where like parts are provided with corresponding reference numerals, and in which.

DESCRIPTION OF PREFERRED EMBODIMENTS

System Overview

Figure 1:
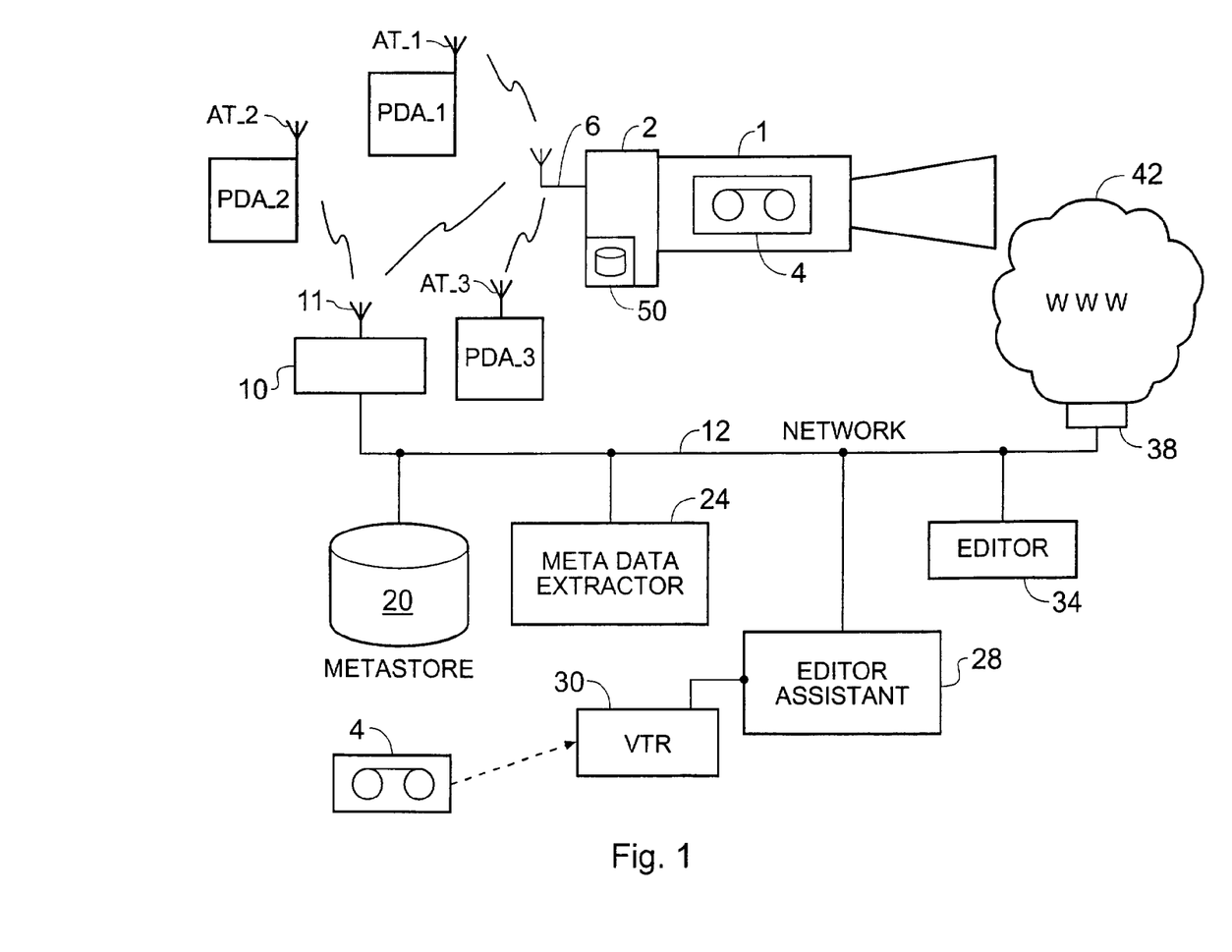
FIG. 1 is a schematic block diagram of a system for generating an a/v production according to an example embodiment of the invention.

FIG. 1 provides an example configuration illustrating embodiments of the present invention. Embodiments of the present invention provide a facility for generating material in an efficient and cost-effective manner. Advantages of the embodiments will become apparent from the following explanation. However, generally, the workflow in generating material is improved, with an enhanced arrangement for compatibly and consistently communicating metadata.

FIG. 1 provides an example illustration of a system and apparatus embodying the present invention, in which an audio/video (a/v) production is made. Thus, in the following description, the material generated is a/v material. However, it will be appreciated that a/v material is just one example of information material which can be generated. Other examples include financial data, inventory data or indeed any other kind of information, particularly, but not exclusively, where the amount of information generated makes it difficult for users to navigate through this material.

In FIG. 1, a camera 1 includes a camera adapter box 2. The camera 1 is an example of a material generation apparatus. The camera 1 in operation captures images and sounds and represents these images and sounds as a/v material which is recorded on a cassette tape 4. The cassette tape 4 provides a linear storage medium but is one example of a data carrier on which the audio/video material may be stored. Another example of a data carrier could be a non-linear storage medium such as a hard disk. However it will be appreciated that the data carrier could be any medium or signal for representing data.

According to the example embodiment, the camera adapter box 2 is a mountable unit, which can be removed from the camera 1. However, it will be appreciated that the camera adapter box is just one example of a utility unit, which, in alternative embodiments may be integrated within the camera 1. In a general sense the camera adapter box 2 is a utility device, the function of which is explained in the following paragraphs.

The camera adapter box 2 attached to the camera 1 provides a facility for generating metadata. The metadata may comprise different metadata types, some of which may describe the content of the a/v material and others may describe the attributes of the camera which were used when the a/v material was generated. The camera adapter box 2 also includes an antenna 6, which is coupled to a radio communications transmitter/receiver within the camera adapter box 2. The radio communications transmitter/receiver (not shown in FIG. 1) provides a facility for radio communications with a wireless ethernet communicator 10 via an antenna 11 through which ethernet communication is provided with devices connected to a network 12.

As shown in FIG. 1, devices are connected to the network 12. The network 12 provides a facility for communicating data between the devices. Connected to the network 12 is a meta store 20, a metadata extractor 24, an editor assistant 28, which also includes a video tape recorder 30, and an editor 34. The devices may use metadata for difference purposes. Each device is an example of a metadata node or meta node. The PDAs and the camera adapter box may also form meta nodes.

Also connected to the network 12 is a gateway 38 providing a facility for communicating with devices connected to the world-wide-web WWW represented as a cloud 42. Also forming part of the material development system in FIG. 1 are three personal digital assistants (PDAs), PDA_1, PDA_2 and PDA_3. Each of the PDAs includes an antenna AT_1, AT_2, AT_3. As will be explained in the following paragraphs, each of the PDAs PDA_1 PDA_2, PDA_3 is provided with a radio communications transmitter/receiver device. The radio transmitter/receiver is arranged to provide a wireless radio communications link with either the camera adapter box 2 attached to the camera 1 or the wireless ethernet communicator 10. The wireless radio communications link may operate in accordance with a wireless standard such as IEEE 802.11.

The personal digital assistants are one example of assistant devices operable to provide a portable means for data storage and display and may include a user interface.

As will be explained in the following paragraphs, the material development system shown in FIG. 1 provides a facility for generating a/v material which is recorded onto the cassette tape 4. As explained in our co-pending UK patent application numbers 0008431.9 and 0008427.7, the camera adapter box 2 generates metadata as the a/v material is produced and recorded onto the cassette tape 4. However, typically, the camera will be operated away from a studio in which facilities are provided for editing the a/v material into an a/v production. As such, when the camera 1 is operating off-site away from the studio, the camera adapter box 2 is arranged to store metadata on a removable hard disk 50 which is shown to form part of the utility box 2. Furthermore, when the camera is being operated away from the studio, a wireless communications radio link is formed between the camera adapter box 2 and the PDAs which are in radio communications range of the camera adapter box 2. Accordingly, when in range, the camera adapter box 2 can communicate metadata via the radio communications link to the PDAs PDA_1, PDA_2, PDA_3. However, when the camera adapter box is in radio communications range of the ethernet wireless link 10, then metadata can be communicated via the wireless ethernet link to the network 12. Therefore any of the devices connected to the network 12 can have access to the metadata.

The a/v material itself, which is recorded onto the cassette tape 4, is typically transported separately and ingested into a VTR 30 by loading the cassette tape 4 into the VTR 30. As disclosed in our co-pending UK patent application 0008429.3, the VTR may form an ingestion processor, which is arranged to recover the a/v material from the cassette tape 4. However, as explained in our co-pending application 0008429.3, the metadata provides a facility for identifying content items present in the a/v material and for navigating through these content items using the metadata.

Figure 2:
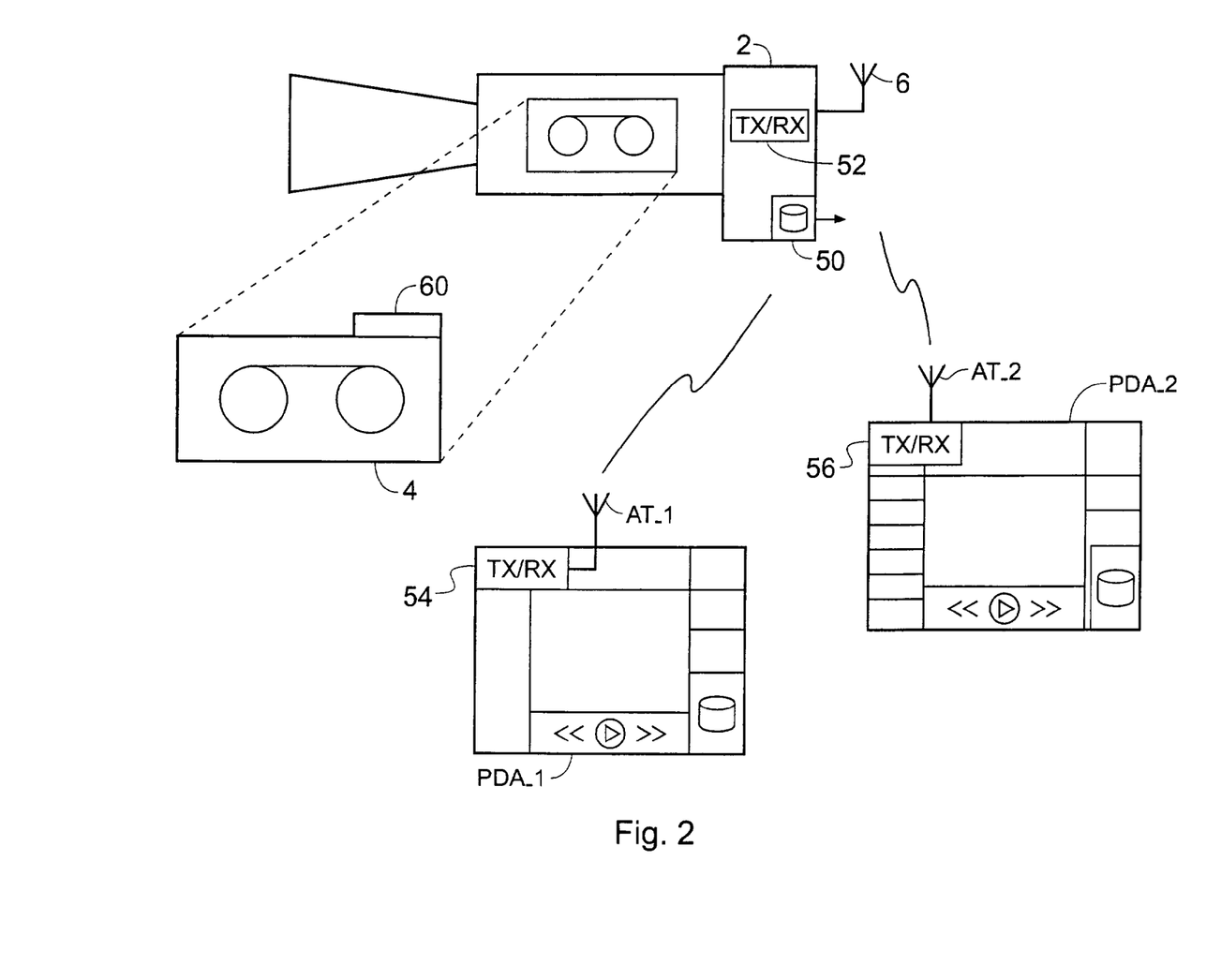
FIG. 2 is a schematic block diagram of a camera with a camera adapter box and personal digital assistants shown in FIG. 1 operating remotely.

As shown in FIG. 2, the cassette tape 4 includes a data store 60 which may be, for example, an electronically readable label such as a TELE-FILE™ label providing a facility for identifying the cassette tape 4. The label is therefore one example of a volume identifier (ID), which is used to identify the a/v material or a collection of a/v material on the cassette tape 4. Typically, but not exclusively, the volume ID identifies the data carrier (cassette tape) on which the a/v material is stored.

The camera 1 with the camera adapter box 2 is shown in more detail in FIG. 2 with two of the PDAs PDA_1, PDA_2. The configuration shown in FIG. 2 reflects a situation where the camera is used away from the network shown in FIG. 1. Accordingly, as explained above, the PDAs are communicating with the camera adapter box 2 via the wireless communications link formed between the antennae AT_1, AT_2, 6 and the wireless transmitters and receivers 52, 54, 56.

As the camera 1 is generating the a/v material, the camera adapter box 2 is arranged to generate a proxy version of the a/v material. For the example of video material, a video proxy is produced. The video proxy provides a lower quality, lower bandwidth representation of the video material. The a/v proxy is then stored on the data store 50. The proxy may also be communicated on request to any of the PDAs PDA_1, PDA_2 via the wireless communications link. Furthermore, when the camera is within radio communications range of the ethernet wireless link 10, the a/v proxy may be communicated via the network 12 to any of the devices connected to the network 12.

The system presented in FIGS. 1 and 2 provides an improved facility for generating a/v productions. This is provided by arranging for the camera adapter box to communicate metadata generated with the a/v material to either the PDAs or any device connected to the network when in range of the wireless ethernet link. As such the camera adapter box forms a meta node when in radio communications range of the network. Therefore, the generated metadata may by systematically accessed from any device on the network. Furthermore as explained in the following paragraphs the PDAs can be arranged to generate further metadata which can provide a preliminary edit of the a/v material using the metadata.

Personal Digital Assistant

As disclosed in our co-pending UK patent applications 0008431.9, 0008393.1 and 0008427.7, the PDAs PDA_1, PDA_2, provide an improved facility for producing an edited a/v production. To this end, embodiments of the present invention are able to introduce an improved workflow when generating a/v productions. The improved workflow is achieved by arranging for the camera adapter box 2 to communicate metadata to the PDAs PDA_1, PDA_2. Included within this metadata can be a representation of the audio/video proxy generated by the camera adapter box 2.

The personal digital assistants PDA_1, PDA_2 include a graphical user interface for displaying the video proxy and for entering commands and edit decisions with respect to the video proxy material. Part of the metadata communicated to the PDAs is the volume ID, that is the TELE-FILE™ label 60, of the tape 4. A user may enter edit decisions as the a/v material is generated.

A facility provided by the PDAs shown in FIG. 2 is to identify a particular event, which has been captured by the camera. For example, the camera 1 may be one of several cameras which are used to cover a sports event. If a particular event happens during for example a football match, such as a goal, then an editor can identify this event at the time or just after the event has occurred. According to an embodiment of the present invention, the PDAs are provided with a command, which is activated through the user interface to request metadata identifying the a/v material representing the event. The request is communicated via the radio communications link to the camera adapter box 2. In response to the request to mark an event, the camera adapter box 2 recovers the time code data at the time of the request and communicates the time code data to the PDAs. Optionally, the camera adapter box may also communicate the volume ID of the cassette tape 4. The PDAs are therefore provided with a unique identifier of the point in the a/v material where this event has been captured. As such, an advantage is provided in that the a/v material may be more easily edited or navigated through to identify the point in the a/v material where the event is captured.

In an alternative embodiment the camera adapter box is operable to communicate a Unique Material Identifier (UMID) in response to the request to mark an event from the PDA. The UMID can be used to identify a frame of video stored on a data carrier such as a hard-disk.

As mentioned above, the a/v proxy may form part of the metadata communicated on request to the PDAs via the wireless communications link. However, in order to avoid duplication of the a/v proxy version stored in the camera adapter box 2, and the a/v proxy communicated to the PDAs, the PDAs do not store the a/v proxy. Accordingly, an advantage is provided in that a plurality of versions of the a/v proxy are not made thereby avoiding the danger of multiple versions of the same a/v proxy and metadata existing which may later be confused.

Application Programmer's Interface

In addition to the above mentioned aspects providing improvements in generating a/v-productions, embodiments of the present invention provide a facility for efficiently communicating metadata between devices connected to the network 12 or indeed the internet. As will be explained in the following paragraphs, embodiments of the present invention provide a facility for communicating metadata with any device or resource connected to the world-wide web. The communication and manipulation of metadata is achieved by providing a common application programmer's interface which is used by any device to send or receive metadata to or from any other device connected to the network 12 or the world-wide web 42.

Figure 3:
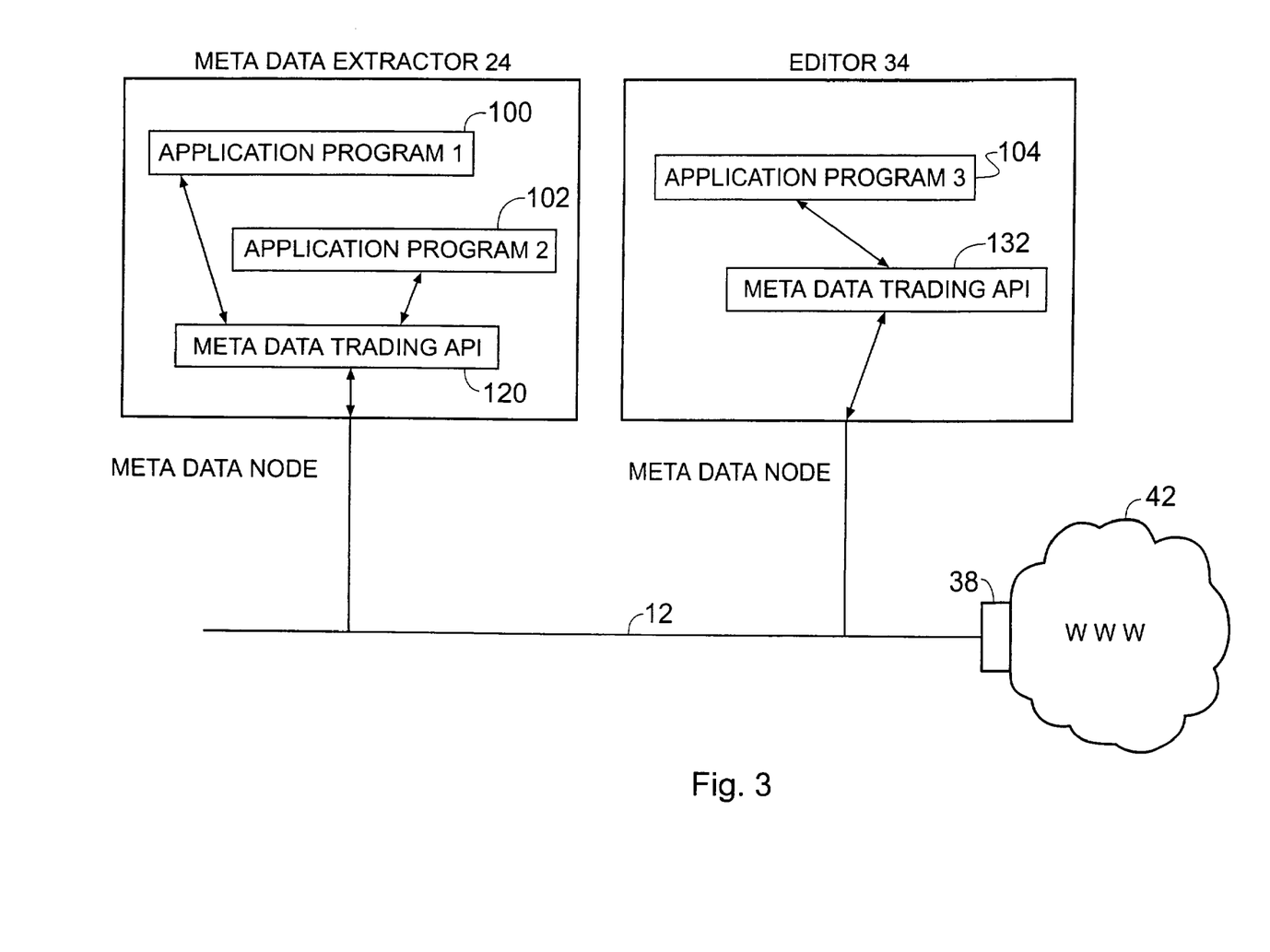
FIG. 3 is a representation of software processors operating on devices forming metadata nodes connected to the network shown in FIG. 1.

The application programmer's interface may include middle-ware processors which allow separate application programs and common resources to communicate and work with one another. FIG. 3 provides an example of a configuration of application programs which may be operating on any one of the devices 20, 24, 28, 34 or indeed the camera 1 or the PDAs PDA_1, PDA_2, PDA_3. The application programs may send and receive metadata to application programs which are operating on other devices, or indeed on the same device. As shown in FIG. 3, three application programs 100, 102, 104 are operating to process metadata as part of one of the devices connected to the network 12. So, for example, the first two application programs 100, 102 may be operating on the metadata extractor 24 whereas the third application program 104 may be operating on the editor 34. As shown in FIG. 3, the metadata extractor 24 and the editor 34 form metadata nodes connected to the network 12.

Embodiments of the present invention provide an application programmer's interface for sending and receiving metadata from other application programmer's interfaces (API) so that the application programs 100, 102, 104 are provided with access to the metadata in a consistent and compatible manner. As such, a metadata trading API 120, 132, embodying the present invention is capable of sending and retrieving metadata from any other metadata trading API connected to the network 12 or indeed the world-wide web 42 via the gateway 38. The metadata API is shown in more detail in FIG. 4.

Figure 4:
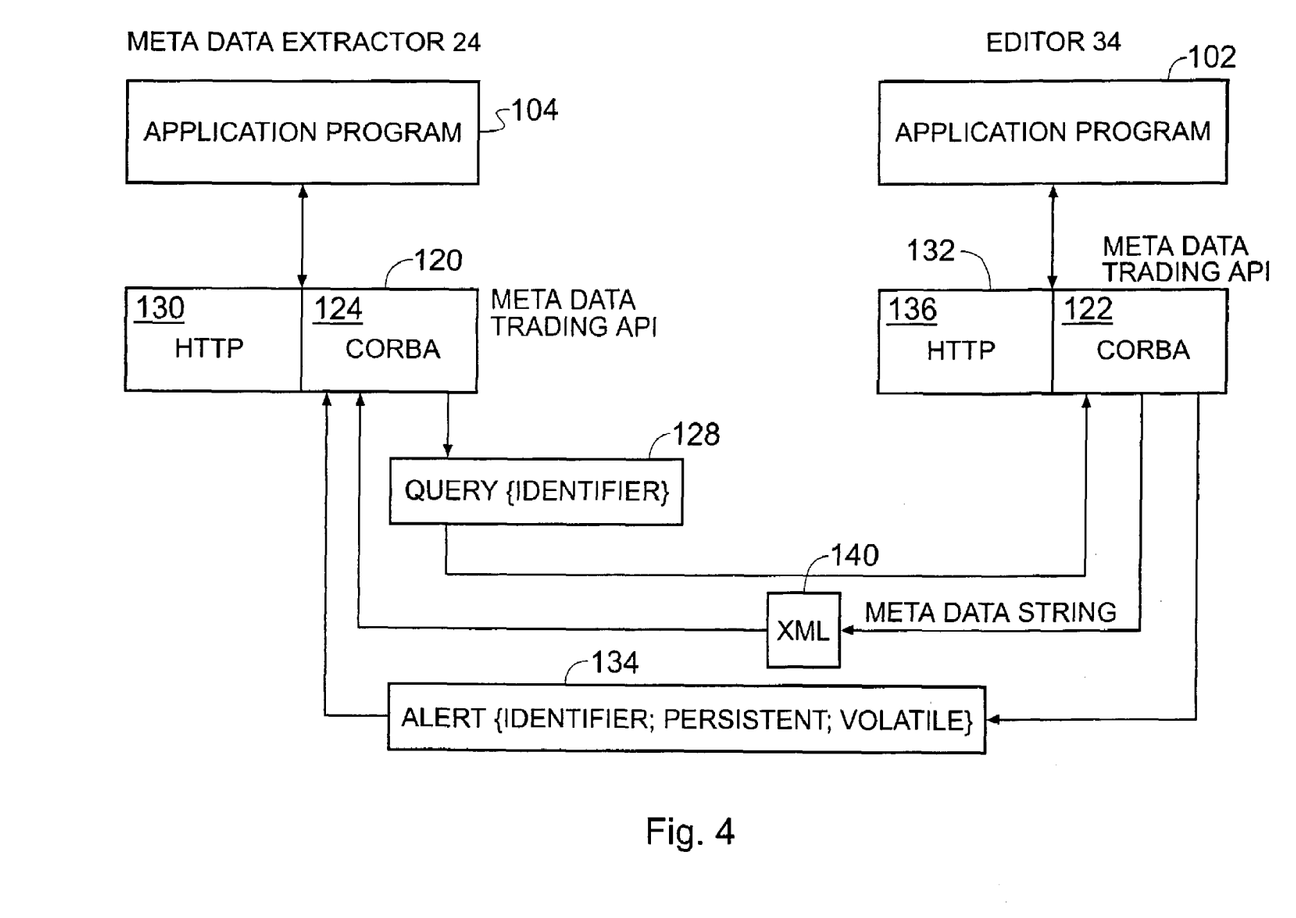
FIG. 4 is a schematic representation illustrating the operation of the software processors shown in FIG. 3, including an application programmer's interface according to an embodiment of the present invention.

As shown in FIG. 4, the metadata trading API 120 provides access to metadata which describes the essence or attributes of a/v material to the application program 104 which may perform a particular function, such as editing, post processing or archiving. As shown in FIG. 4, the metadata trading API comprises a signalling protocol processor 124, 122 and a file transfer processor 130, 136. The signalling protocol processor according to the example embodiment shown in FIG. 4 operates in accordance with the Common Object Request Broker Architecture (CORBA) signalling protocol standard. The CORBA signalling protocol provides a protocol for remote invocation and querying of a data store or database. Other examples of signalling protocols are SOAP (Simple Object Access Protocol) or DCOM (Distributed Common Object Model), or indeed any other signalling protocol which is arranged to exchange query and response messages with a corresponding signalling protocol processor for accessing data.

The file transfer processor according to the example embodiment shown in FIG. 4 is operable in accordance with a Hyper-Text Transfer Protocol (HTTP) to access metadata resources. The metadata resources could be, for example, a proxy of the a/v material, a key stamp of the video material, or a compressed representation of the video material. Correspondingly, the metadata resources could include an audio waveform server representative of the audio material, or indeed metadata resources could be any other type of metadata representing the content of information material generally. For the example embodiment, the metadata resource is the video proxy generated by the camera adapter box representing the video material generated by the camera.

According to an example embodiment of the present invention, when the signalling protocol processor 120 requires access to metadata associated with a particular item of a/v material, the signalling protocol processor 124 provides at least two signalling messages which are a query string 128 and an alert string 134.

The query string is communicated to another metadata trading API on another meta node connected to the network as shown in FIG. 3. The query string includes an identifier string identifying the a/v material item for which metadata is requested. For example, the query string may identify a shot present on a particular data carrier. In response to the query string, a metadata trading API generates a metadata string providing the metadata associated with the a/v material item. Accordingly, as shown in FIG. 4, the signalling protocol processor 122 of the other metadata trading API 132 is arranged to respond to the query string by retrieving metadata associated with the a/v material item identified by the query string. The other metadata trading API 132 returns the metadata in the form a metadata string 140 and communicates the metadata string 140 in accordance with the CORBA signalling protocol to the original metadata trading API 120.

According to an embodiment of the present invention, the metadata string 140 is in the form of an extended mark-up language XML. The format of the XML metadata string 140 will be explained in more detail in the following paragraphs. However, typically, the metadata string 140 will include a resource identifier providing a location address of a metadata resource. The metadata resource will typically be a significant amount of data comprising binary information which is too large to be efficiently communicated by the signalling protocol processor. For the present example embodiment this is the video proxy generated by the camera adapter box 24.

The metadata string is delivered to the application program 104 as metadata. However, the metadata resource is not transferred with the metadata string. The metadata resource is accessible to the application program using the file transfer processor 130. The file transfer processor 130 is operable on request from the application program 104 to retrieve the metadata resource at the location address indicated by the resource identifier provided as part of the metadata string. In one embodiment, the resource identifier is a Uniform Resource Identifier (URI) address and the file transfer protocol is operable in accordance with a Hyper Text Transfer Protocol (HTTP) to retrieve the metadata resource. As will be appreciated, an advantage is provided by the metadata trading API in that the metadata resource is accessible via any appropriate web browser using the URI address. Accordingly, as will be appreciated, the metadata resource may exist on any of the metadata nodes on the devices connected to the network 12 or indeed a metadata resource is accessible from any address present on the world-wide web 42.

A further advantageous aspect of the metadata trading API embodying the present invention will now be explained with reference to FIG. 5.

Figure 5:
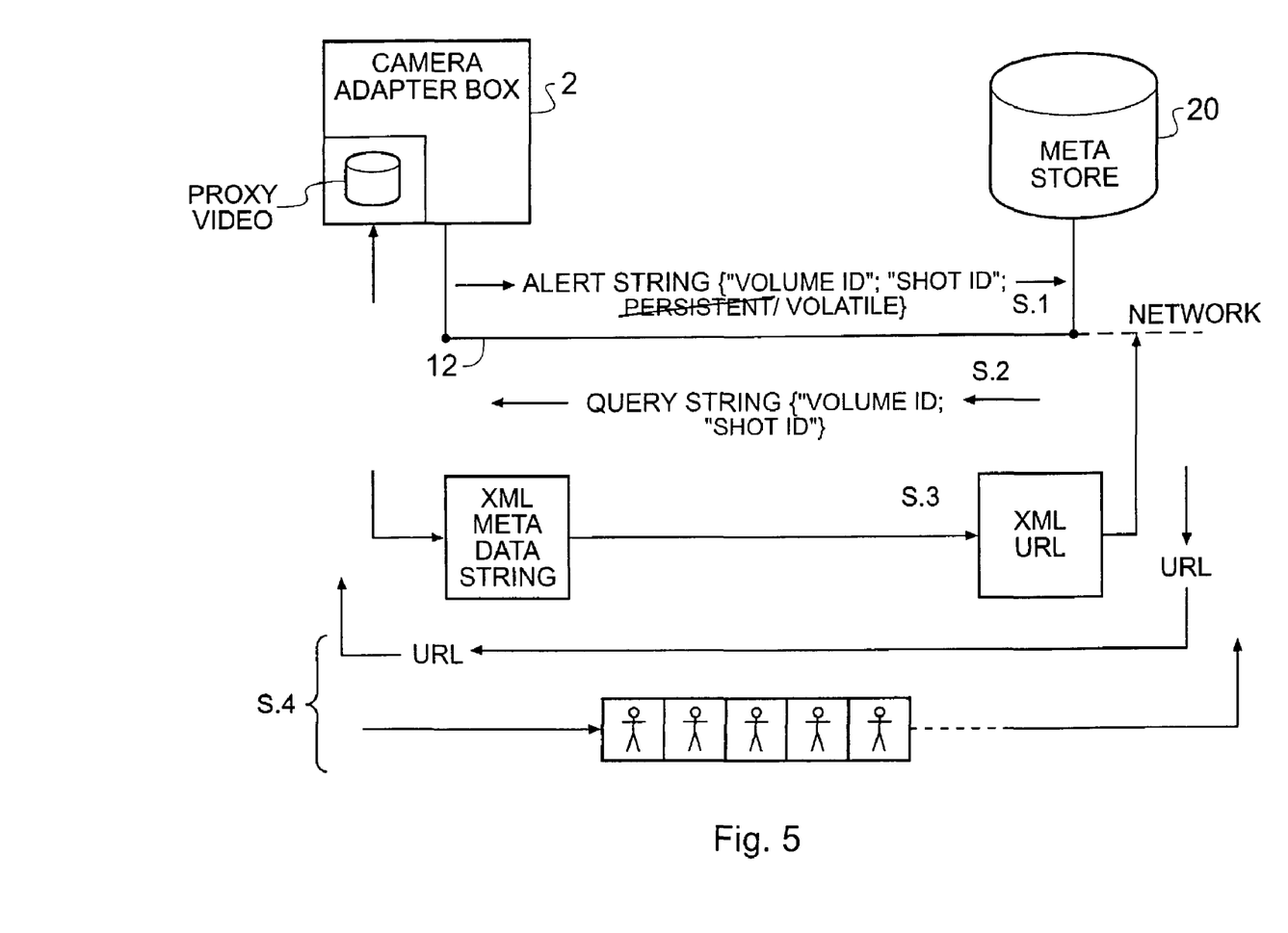
FIG. 5 is a schematic block diagram illustrating a sequence of operations which are performed by the camera adapter box and a meta store appearing in FIG. 1, by the applications programmer's interfaces which appear in FIGS. 3 and 4.

FIG. 5 provides a simplified representation of the camera adapter box 2, which is linked to the data communications network 12 via the wireless ethernet card 10. However, as already explained, the camera adapter box 2 is only capable of communicating data when within a range of the wireless ethernet card 10. As such, the metadata stored in the camera adapter box is an example of a metadata resource which is volatile. Correspondingly, therefore, metadata stored in one of the devices connected to the network 12, such as the metadata store 20, the metadata extractor 24 or the editor 34, are examples of devices providing a persistent resource of metadata. A persistent metadata resource is one which remains permanently or semi-permanently at an address and is constantly accessible from the network.

In order to accommodate metadata resources which are volatile, that is to say resources which may not be available at a later point in time, the signalling protocol processor 122, 124 is arranged to generate an alert string 134 indicating that metadata is available. The alert string includes an identifier for the a/v material item for which the metadata was generated. In addition to the identifier, the alert string also includes an indication as to whether the metadata resource identified with respect to the a/v material is persistent or volatile. Accordingly, an application program may react to a received alert string by arranging for a metadata string to be received from the metadata node which generated the alert string, when the application program has an opportunity or a requirement to receive the metadata string. The application program can use the indication as to whether the metadata resource is volatile or persistent in order to decide whether or not to receive the metadata resource located at the URI address provided with the metadata string. If the alert string indicates that the metadata resource is persistent, then the API may not transfer the metadata resource to its application program until this is required. Not transferring the metadata resource until it is necessary to do so has an advantage of reducing an amount of data communicated on the network 12 thereby reducing a bandwidth requirement or congestion and therefore a time to access other metadata resources. If, on the other hand, the alert string indicates that the metadata resource is volatile, the metadata trading API 120 can be arranged to access the metadata resource by downloading the metadata resource to an application program via the API before the resource is no longer available.

As shown in FIG. 5, therefore, the camera adapter box 2 sends an alert string to the metadata store 20 via the network 12 when the camera adapter box is within range of the wireless ethernet communications link provided by the wireless ethernet card 10. As shown in FIG. 5, the alert string S.1 identifies the a/v material item for which metadata has been generated and an indication as to whether the metadata is persistent or volatile. For the present example, the metadata is volatile because the camera adapter box 2 is not permanently connected to the network. At some point later in time when the metadata store 20 is available to receive the metadata, the API operating on the metadata store 20 generates a query string S.2. The query string provides a corresponding identification of the a/v material item for which the metadata is now to be transferred. In response to the query string, the camera adapter box 2 communicates a metadata string S.3 which comprises an XML data string to the metadata store 20. However, at step S.4 because the alert string indicates that the metadata resource is volatile, the signalling protocol processor of the API of the meta store 20 arranges for the file transfer protocol 130 to transfer the metadata resource to the meta store 20 before the metadata resource is no longer available.

In the above explanation of the operation of the metadata trading API, the query string could be in the form of any query language such as XQL or SQL indicating an item of data entered into a relational database. Alternatively, the query string could be an Xpath query information data string, for accessing a database formed in a related way. Expressing the metadata in the form of an XML language provides an advantage in that metadata may be exchanged in a consistent and compatible way. The XML format of the metadata string will be explained in more detail in the following paragraphs.

Metadata String Structure

Figure 6A:
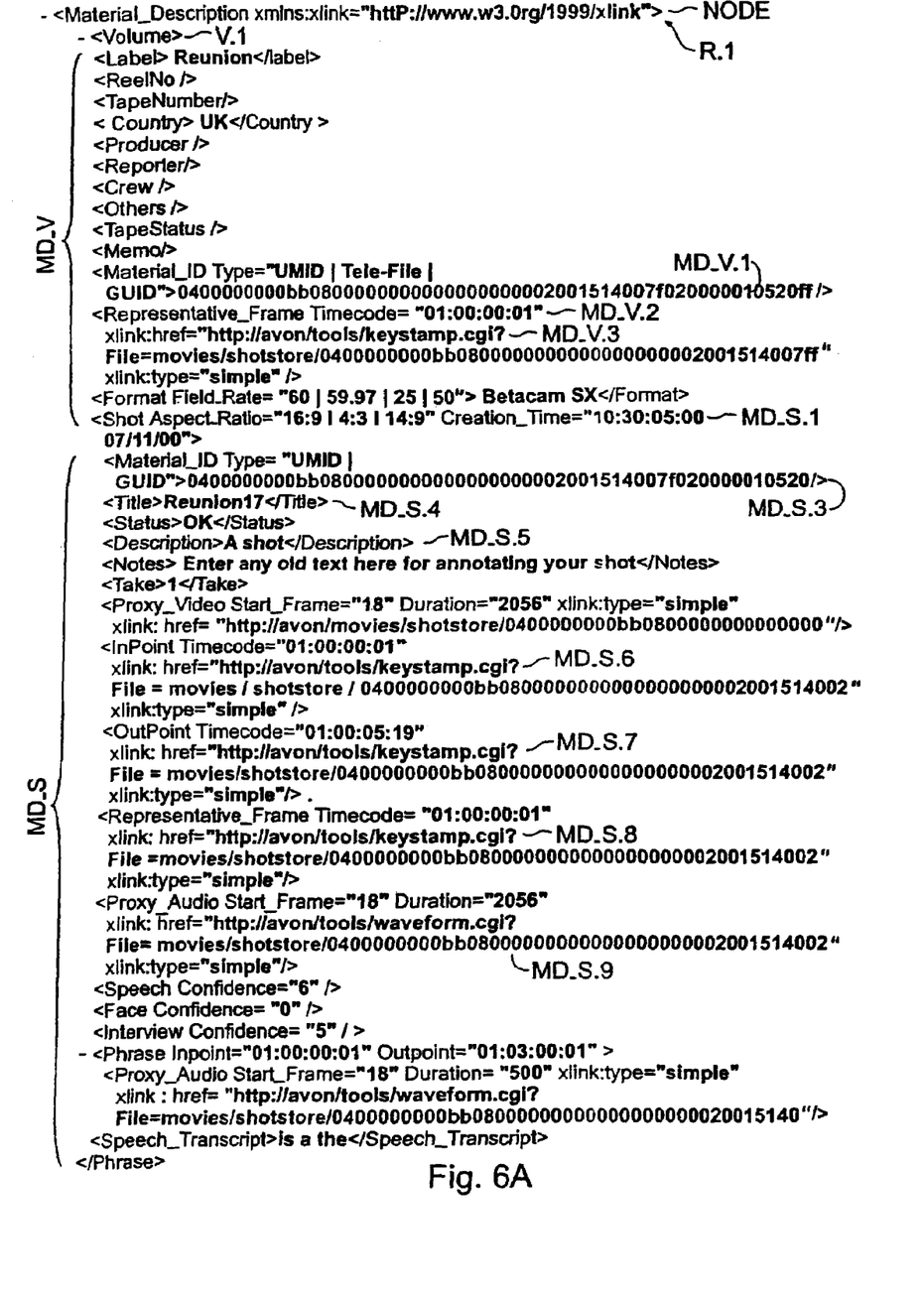
FIGS. 6A and 6B is an illustration of a metadata string in the form of an extended mark-up language, which are communicated by the system shown in FIG. 1 as illustrated in FIG. 5.
Figure 6B:
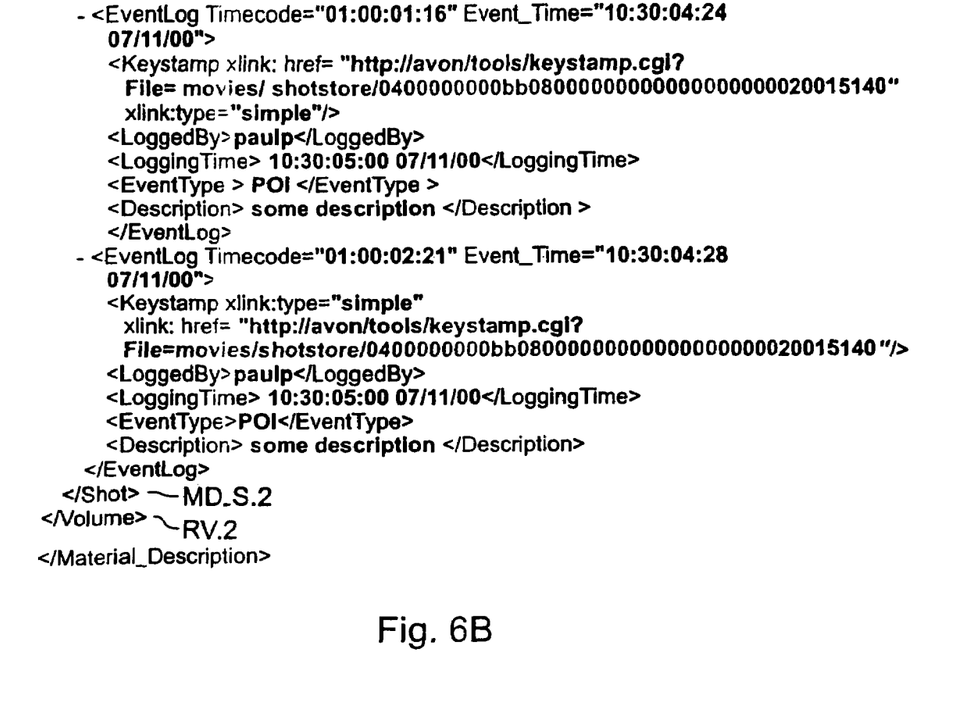

An example of a metadata string in XML format is shown in FIG. 6. XML is one example of a mark-up language in which a metadata string can be described, other examples being HTML, WML and SMIL (Synchronised Multi-media Integrated Language).

As shown in FIG. 6, the first line of the XML metadata string provides a reference string for a schema which defines and specifies how the XML metadata string should be interpreted. The first line R.1 (NODE) in FIG. 6 provides a reference to an HTTP address of www.w3.org\1999\xlink, from which an address of a web-site where a schema defining the structure and rules for interpreting the XML metadata string may be found.

The part of the XML metadata string which provides the location of the web-site for accessing the rules for the schema is called a 'namespace declaration'. The schema defining the correct structure of the metadata string may be declared within the XML string using the following semantics:

<Material_Description xmlns:xlink=http://www.w3.org/ 1999 / xlink xmlns:xsi="http://www.w3.org/2001/ XMLSchema-instance"xsi: noNamespaceSchemaLocation="D: \Temp\metanet_generated.xsd">

Two attributes which define the schema in a Material_Desription node are i) a namespace declaration specifying that the 'xsi' namespace will be used ('xsi' stands for XML Schema Instance) and 2) a noNamespaceSchemaLocation attribute. This is a way of defining the location of the schema document which is used to validate the structure of the XML document. The value of this attribute indciates that the schema is located on a local hard drive "D" in a directory "Temp", and the schema is called "metanet_generated.xsd". This location could be a URI address that refers to a file on the world-wide web. However, this file could be owned, maintained and hosted by any particular organisation or company.

According to the example embodiment of the present invention represented in FIG. 6, a minimum requirement for identifying a/v material for which metadata has been generated requires a volume identifier (ID) and a shot identifier (ID). The volume ID defines a volume within the metadata XML string and is defined between a start volume node V.1 and an end volume node RV.2. After each volume node, the XML metadata sting includes a set of metadata associated with the volume. The metadata associated with the volume MD_V is shown in FIG. 6 to include metadata fields such as "reporter", "producer", "country"and "tape number", etc. Also included in the metadata volume MD_V is a material ID type which could be a Unique Material Identifier (UMID), a TELE-FILE label or a Globally or Universally Unique Identifier (UUID) which is represented at line MD_V1. Also included as part of the volume metadata MD_V is a URI address of a key stamp which identifies the volume associated with a time code of "01:00:00:01" provided in lines MD_V2 and MD_V3.

At a next level in the XML metadata string there is provided a shot node for identifying a shot of a/v material with which metadata is associated. A shot node in the XML metadata string is defined by a shot start node MD_S1 and a shot end node MD_S2. Within the shot node of the XML metadata string there is provided a set of metadata fields and values MD_S. Included within the shot metadata MD_S is a material ID type. The material ID type indicates a UMID or a GUID provided in line MD_S3, a title MD_S4, a description MD_S5, and a URI address of key stamps representing events within the shot MD_S6, MD_S7, MS_S8. Also included within the shot metadata MD_S is a metadata field and value identifying the Uniform Resource Identifier address of an audio waveform server MD_S9.

Thus, as will be appreciated from the representation of the XML metadata string shown in FIG. 6, the string includes a volume ID and a shot ID which are represented at different hierarchical levels, the shot being nested inside the volume node. Following each volume and shot node there is provided metadata associated with the volume and the shot respectively. A plurality of shot nodes may also be nested within a single volume and typically a/v material will be represented in this way for the metadata string. A simplified representation of the XML metadata string structure is shown below in which the metadata string starts with a URI for the schema for interpreting the metadata string at a root node level. A plurality of shots are arranged at a common hierarchical level which is the second hierarchical level shown below:

<Material Description, Schema address>
  <Volume Material ID = "Vol 1">
    <Shot Material ID = "Shot 1">
      <UMID>
      <URI>
    </ Shot>
    <Shot Material ID = "Shot 2">
    </ Shot>
  </Volume>
  <Volume Material ID = "Vol 2">
    . . .
    . . .
    . . .
  </ Volume>
</Material Description>

According to the simplified XML metadata string presented above, metadata associated with a particular shot may be accessed with an X-path string using the following query string to access "Volume 012; Shot 023":

"xpath:\\Material_Description\Volume[Volume [@Material_ID="Volume012"]\Shot[@Material_ID="Shot 023"]"

The term node or tree node is used to reflect a tree-like data structure which provides a hierarchy of data levels.

Further Examples

The structure of the XML metadata string allows shots to be placed within shots (as kind of sub shots). For instance, take a shot of Mike and Barney:

```
<Shot Material_ID="bigshot_01">
    <Label>Interview with Mike and Barney</Label>
    <InPoint Timecode="01:00:00:00">
    <OutPoint Timecode = "01:10:00:00>
</Shot>
```

A shot may have two logical sections. For example the first part of an interview is with Mike. Then, the camera still rolling turns to Barney and does an interview with him. Even though this is physically one shot, this shot could be segmented into two 'sub-shots' by either a manual or automatic process. This can be represented in the XML in the following way:

```
<Shot Material_ID="bigshot_01">
    <Label>Interview with Mike and Barney</Label>
    <InPoint Timecode="01:00:00:00">
    <OutPoint Timecode = "01:10:00:00>
    <Shot Material_ID="subshotofbigshot_01_01">
        <Label>Interview with Mike</Label>
    <InPoint Timecode="01:00:00:00">
        <OutPoint Timecode = "01:05:00:00>
    </Shot>
    <Shot Material_ID="subshotofbigshot_01_02">
        <Label>Interview with Barney</Label>
    <InPoint Timecode="01:05:00:01">
        <OutPoint Timecode = "01:10:00:00>
    </Shot>
</Shot>
```

Furthermore, Mike's interview could be broken down again into two further sub-shots. For instance if Mike starts talking about his acting career, and then moves on to talk about his film directing, the metadata string could be represented as follows:

```
<Shot Material_ID="bigshot 01">
    <Label>Interview with Mike and Barney</Label>
    <InPoint Timecode="01:00:00:00">
    <OutPoint Timecode = "01:10:00:00>
    <Shot Material_ID="subshotofbigshot_01_01">
        <Label>Interview with Mike</Label>
    <InPoint Timecode="01:00:00:00">
        <OutPoint Timecode = "01:05:00:00>
        <Shot Material_ID="subshotofsubshotofbigshot_01_01>
        <Label>Mike the actor</Label>
        <InPoint Timecode="01:00:00:00">
            <OutPoint Timecode = "01:02:30:00>
    </Shot>
<Shot Material_ID="subshotofsubshotofbigshot_01_02>
        <Label>Mike the director</Label>
        <InPoint Timecode="01:02:30:01">
            <OutPoint Timecode = "01:05:00:00>
        </Shot>
    </Shot>
    <Shot Material_ID="subshotofbigshot_01_02>
        <Label>Interview with Barney</Label>
    <InPoint Timecode="01:05:00:01">
        <OutPoint Timecode = "01:10:00:00>
```

-continued

```
    </Shot>
</Shot>
```

Therefore any of the shots or sub-shots could be broken down into further sub-shots. The only limit would be that no sub-shot can be shorter than one frame, so this is the physical and logical limit of the nesting of shots within shots.

As will be appreciated from the foregoing description, the XML metadata string provides an encapsulated wrapper for metadata, which may be accessed using a query string. As will be appreciated by those skilled in the art, the query string defines the volume at the first hierarchy and the shot or sub-shot at the second hierarchy and possibly a particular item of, or field of, metadata which is being accessed by an API at a third hierarchy. The metadata string, alert string and query string are formed from ascii characters or Unicode.

Various modifications may be made to the embodiments hereinbefore described without departing from the scope of the present invention. In particular, it will be appreciated that any form of mark-up language could be used to describe the metadata string, XML being just one example. Furthermore, various modifications may be made to the XML metadata string without departing from the scope of the present invention. For example, other metadata examples may be introduced and the relative level of each of the volume and shot metadata types may be varied with the relative logical association of shots within volumes being maintained.

As explained above a/v material is just one example of information material, other examples being financial data, inventory data or any other kind of information data. As such in this context it will be appreciated that the term "shot" refers to a unit, portion or segment of the information material, which may have been generated over a particular period. For such an example, the shot would represent a snap-shot of the information material.

The invention claimed is:

1. A network of devices including a first, second and third network device, each of the devices being interconnected by a data communications network and configured to use metadata describing a content of at least one shot or sub-shot of information material, the network devices forming metadata nodes, wherein each of said network devices is configured to communicate the metadata as a data structure the data structure comprising:

a volume identification defining a data carrier on which said information material is contained;

at least one shot identification defining said at least one shot or sub-shot within said information material; and at least one type of metadata associated with the content of the shot or sub-shot, wherein the volume identification is arranged at a first hierarchical level and the shot identification is arranged at a lower hierarchical level, said volume identification and said shot identification being defined as tree nodes in accordance with said first and said lower hierarchical levels, said volume identification having a start point and an end point defining a volume node and said shot having a start point and an end point defining a shot node, and said metadata describing the shot or sub-shot is contained within said shot hierarchical level and said metadata contained within the shot node includes a resource identifier providing a location address of a metadata resource representing an amount of data, the amount of data being stored on the third network device, wherein said information material includes video material, the metadata resource being a proxy version of the video material the proxy version being a reduced bandwidth version of the video material, and wherein the first of the network devices is configured to communicate, to the second of the network devices, an alert string indicating whether the metadata describing the content of the video material is available on the network on a persistent or volatile basis, and to communicate the metadata describing the content of the video material to the second of the network devices using the data structure;

the second network device is configured to receive the metadata in the form of the data structure, store the metadata in the form of the data structure, and determine the location address of the proxy version of the video material from within the data structure of the metadata, and following the determination of the location address from the data structure, the second network device is configured to receive the proxy version of the video material from the third network device at the location identified by the location address.

2. The network of claim 1, wherein one type of said metadata comprises volume metadata describing the content or attributes associated with the material contained on the volume and shot or sub-shot metadata describing the content or attributes associated with the shot or sub-shot.

3. The network of claim 1, wherein a plurality of shots or sub-shots are arranged within said lower hierarchical level.

4. The network of claim 1, wherein said hierarchy of said volume and shot or sub-shot nodes are arranged such that the hierarchy is defined by a schema in accordance with predetermined rules, the rules being established to separate and extract metadata of different types in accordance with said hierarchy.

5. The network of claim 4, wherein said schema is defined in accordance with a mark-up language.

6. The network of claim 5, wherein said mark-up language is XML.

7. The network of claim 1, wherein said location address of the metadata resource is a Uniform Resource Identifier address allowing access to the resource from a networked device via the World Wide Web.

8. The network of claim 1, wherein one of the types of said metadata contained within the shot or sub-shot node includes a unique or quasi-unique identifier of said information material within the shot or sub-shot node.

9. The network of claim 8, wherein said unique identifier is a Unique Material Identifier (UMID).

10. The network of claim 8, wherein said unique or quasi-unique identifier is a Universally Unique Identifier.

* * * * *